US007224884B2

(12) United States Patent
Kim

(10) Patent No.: US 7,224,884 B2
(45) Date of Patent: May 29, 2007

(54) DESIGN METHOD FOR A VIDEO SIGNAL PROCESSING INTEGRATED CIRCUIT AND INTEGRATED CIRCUIT AND VIDEO SIGNAL PROCESSING APPARATUS THEREBY

(75) Inventor: Chul-min Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1331 days.

(21) Appl. No.: 09/880,923

(22) Filed: Jun. 15, 2001

(65) Prior Publication Data

US 2001/0052944 A1 Dec. 20, 2001

(30) Foreign Application Priority Data

Jun. 16, 2000 (KR) ............... 2000-33230

(51) Int. Cl.
H04N 5/91 (2006.01)
H01L 23/58 (2006.01)
G06F 7/38 (2006.01)
H03B 21/00 (2006.01)

(52) U.S. Cl. ............ 386/68; 386/6; 386/7; 386/8; 257/798; 326/38; 327/106

(58) Field of Classification Search .......... 386/12, 386/17, 48, 61, 84, 93, 1, 46, 68; 348/521, 348/525; 257/798; 326/38; 327/106
See application file for complete search history.

(56) References Cited

U.S. PATENT DOCUMENTS 5,045,943 A * 9/1991 Kurihara ............... 327/50
5,260,800 A * 11/1993 Sturm et al. ............ 386/2
5,557,236 A * 9/1996 Monti ................. 327/565
6,057,722 A * 5/2000 Nakabo ............... 327/172
6,628,888 B1 * 9/2003 Dumont et al. ......... 386/47
6,708,301 B1 * 3/2004 Ohta et al. ............ 714/724

OTHER PUBLICATIONS

National Semiconductor LM1881 Video Sync Separator data sheet, Apr. 2001.*

* cited by examiner

Primary Examiner—James J. Groody
Assistant Examiner—James A. Fletcher
(74) Attorney, Agent, or Firm—Robert E. Bushnell, Esq.

(57) ABSTRACT

A video signal processing apparatus and a design method therefor are provided, and more particularly, a design method for a video signal processing integrated circuit (IC), in which to solve the shortage of pin ports caused by designing a video signal processor in a single IC, a vertical synchronization signal is output and a quasi synchronization signal is input through a single pin port, and an IC and a video signal processing apparatus thereby are provided. According to the design method, by designing a vertical synchronization dividing circuit inside an IC without increasing the number of pins in a video signal processing IC, the present invention can reduce the number of components, material costs, and save the PCB space. In addition, by integrating the vertical synchronization dividing circuit inside an IC, the component difference of a discrete device can be reduced, which enhances IC performance.

14 Claims, 2 Drawing Sheets

FIG. 1 *(Background Art)*

DESIGN METHOD FOR A VIDEO SIGNAL PROCESSING INTEGRATED CIRCUIT AND INTEGRATED CIRCUIT AND VIDEO SIGNAL PROCESSING APPARATUS THEREBY

CLAIM OF PRIORITY

This application makes reference to, incorporates the same herein, and claims all benefits accruing under 35 U.S.C. §119 from an application entitled A Design Method for a Video Signal Processing Integrated Circuit and Integrated Circuit and Video Signal Processing Apparatus Thereby earlier filed in the Korean Industrial Property Office on 16 Jun. 2000, and there duly assigned Serial No. 2000-33230 by that Office.

BACKGROUND OF THE INVENTION

1. Field of the Invention

The present invention relates to a video signal processing apparatus and a design method therefor, and more particularly, to a design method for a video signal processing integrated circuit (IC), in which to solve the shortage of pin ports caused by designing a video signal processor in a single IC, a vertical synchronization signal is output and a quasi synchronization signal is input through a single pin port, and an IC and a video signal processing apparatus thereby.

2. Description of the Related Art

The signal processing field in a video system can be divided into an audio signal processing field and a video signal processing field, and the video signal processing field can be divided again into a color signal processing section and a luminance signal processing section. The conventional video system is formed of separate IC chip sets for an audio signal processing unit, a color signal processing unit, a luminance signal processing unit, respectively, but in line with the recent development in the IC integration technologies, a Y/C one-chip IC, in which a color signal processing unit and a luminance signal processing unit are formed in one chip set, or an A/V one-chip, in which an audio signal processing unit, a color signal processing unit and a luminance signal processing unit are formed in one chip set, is used.

By reducing the number of signal processing ICs, the manufacturing cost for a product can be reduced and particularly, through implementation of an external discrete circuit on an IC chip set, the space on a printed circuit board (PCB) can be saved, which is advantageous in making a smaller product. Also, it is advantageous to manufacturing products when more external circuits are implemented in one IC chip together with unifying signal processing units in one chip set.

However, the unification of signal processing units in one chip and implementation of external circuits in the chip requires more ports and can cause a problem of shortage of pins in the chip. Particularly, the number of pins in the A/V one-chip IC, which is used in the recent video apparatuses, is about 80, and reduction of the number of pins became a more important issue to product designers than integration technologies.

SUMMARY OF THE INVENTION

It is an object of the present invention to provide a design method for a video signal integrated circuit (IC), in which a vertical synchronization dividing circuit is formed inside the IC without increasing the number of IC pin ports, and a vertical synchronization signal is output through a pin port through which a quasi synchronization signal is input, and an IC and a video signal processing apparatus using the same.

To accomplish the above object of the present invention, there is provided a video signal processing integrated circuit (IC) which is used in a video recording/reproducing apparatus, the video signal processing IC having a composite synchronization dividing means for dividing a composite synchronization signal from a video signal; a vertical synchronization dividing means for dividing a vertical synchronization signal from the composite synchronization signal; a single pin port for outputting the vertical synchronization signal and inputting a quasi vertical synchronization signal; and a switching means for outputting the vertical synchronization signal, which is input from the vertical synchronization dividing means, to the pin port, or outputting the quasi vertical synchronization signal, which is input from the pin port, to the quasi vertical synchronization inserting means.

To accomplish another object of the present invention, there is also provided a video signal processing apparatus having a recording and reproducing processor for modulating/demodulating a signal to record or reproduce an input video signal; a composite synchronization dividing means for dividing a composite synchronization signal from the video signal input from the recording and reproducing processor; a single pin port for outputting the vertical synchronization signal and inputting a quasi vertical synchronization signal; a first switching means for outputting the vertical synchronization signal, which is input from the vertical synchronization dividing means, to the pin port, or outputting the quasi vertical synchronization signal, which is input from the pin port, to a quasi vertical synchronization inserting means; the quasi vertical synchronization inserting means for inserting the quasi vertical synchronization signal, which is input from the first switching means, to a video signal, which is processed for reproducing signal; and a second switching means for outputting a signal, which is input from the output terminal of the quasi vertical synchronization inserting means, to a video output port in a special reproducing mode, and outputting a signal, which is applied to the input terminal of the quasi synchronization inserting means, to the video output port in any of the remaining modes.

To accomplish another object of the present invention, there is also provided a method for designing a video signal processing IC having a recording and reproducing processor for modulating/demodulating a signal, a vertical synchronization dividing means, and a quasi vertical synchronization inserting means, the method having the steps of forming a pin port for outputting a vertical synchronization signal and a pin port for inputting a quasi vertical synchronization signal in a single pin port; and designing the pin port to operate as an input port for inputting a quasi vertical synchronization signal, which is output from a microprocessor located separate from the video signal processing IC, in a reproducing mode, and to operate as an output port for outputting a vertical synchronization signal, which is divided in the vertical synchronization dividing means, to the microprocessor separate from the video signal processing IC, in the remaining modes.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art.

Figure 1:
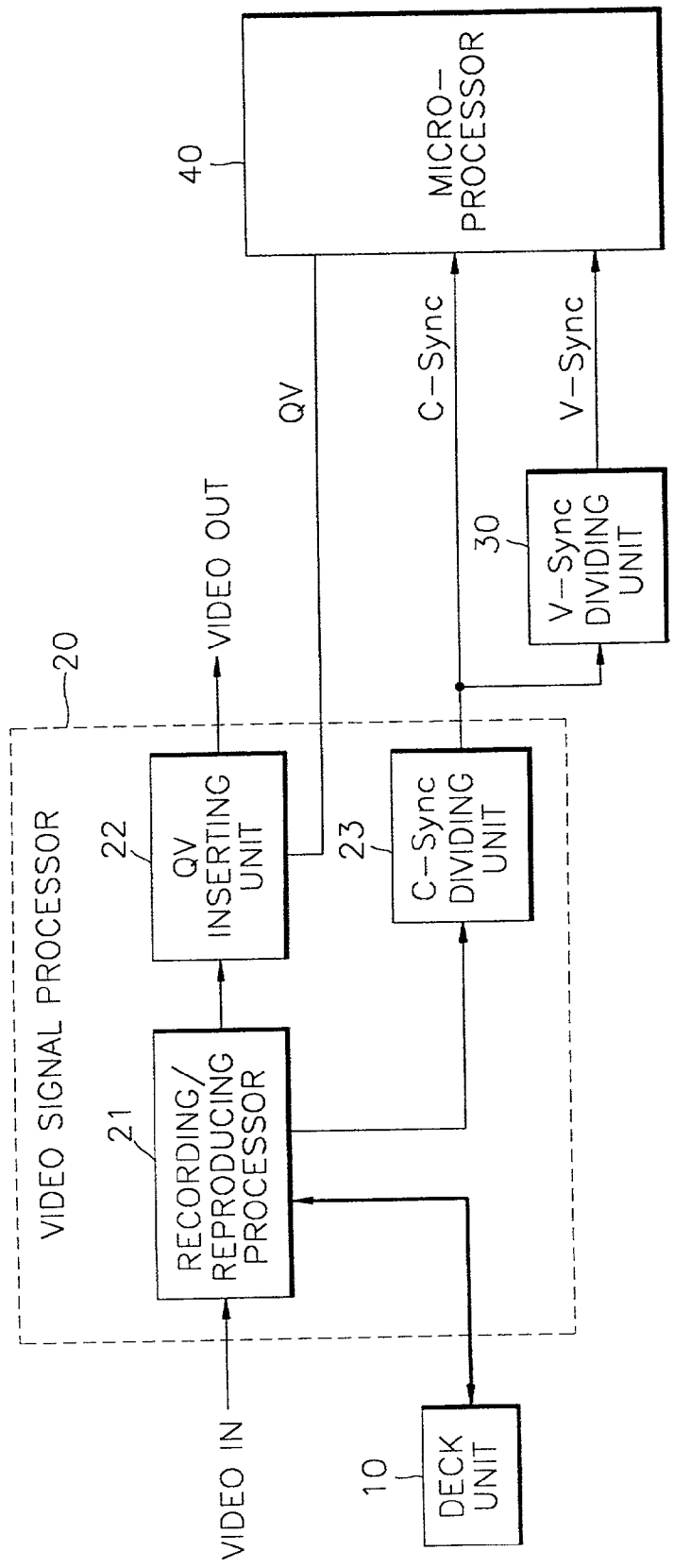
FIG. 1 illustrates an exemplary video signal processing system illustrating a background problem which the present invention is intended to overcome.

FIG. 1 illustrates an exemplary video signal processing system in which a vertical synchronization dividing circuit 30 is implemented as a discrete circuit separate from a video signal processor 20.

The video signal processor 20 is formed of one chip having a recording/reproducing processor 21, a quasi vertical synchronization inserting unit 22, and a composite synchronization signal dividing unit 23.

The recording/reproducing processor 21, in a recording mode, modulates an input video signal (Video In) and provides the modulated signal to a deck unit 10 so that the signal can be recorded in a recording medium, and in a reproducing mode, demodulates a signal read by a video head of the deck unit 10, and outputs the signal in the form of a video signal before recording.

A composite synchronization signal dividing unit 23 receives a video signal output from the recording/reproducing processor 21, and separates the composite synchronization signal (C-Sync), containing a vertical synchronization signal and a horizontal synchronization signal, from the video signal.

A vertical synchronization dividing unit 30 located separate from the video signal processor 20 separates the vertical synchronization signal (V-Sync) from the composite synchronization signal output from the composite synchronization signal dividing unit 23. The composite synchronization signal (C-Sync) and the vertical synchronization signal (V-Sync) are then input to a microprocessor 40.

Microprocessor 40, in a recording mode, controls a drum motor and a capstan motor contained in the deck 10, using the composite synchronization signal and vertical synchronization signal as servo control signals. Microprocessor 40 also generates a quasi vertical synchronization signal (QV, Quasi V-Sync) in special reproducing modes such as a still mode or a slow mode. Here, the quasi vertical synchronization signal QV is a vertical synchronization signal which is arbitrarily generated using a head switching pulse (not shown) for switching a video head contained in the deck 10.

A quasi vertical synchronization inserting unit 22 receives a quasi vertical synchronization signal (QV) output from the microprocessor 40, and inserts the QV into a video signal received from the recording/reproducing processor 21 during one of the special reproducing modes.

In the video signal processing system, formed as described above, if the vertical synchronization dividing unit 30, which is located separate from the video signal processor 20 in FIG. 1, is formed inside, or as an integral part of, the video signal processor 20, an additional IC pin port for outputting a vertical synchronization signal should be prepared. Therefore, the number of IC pin ports increases.

Figure 2:
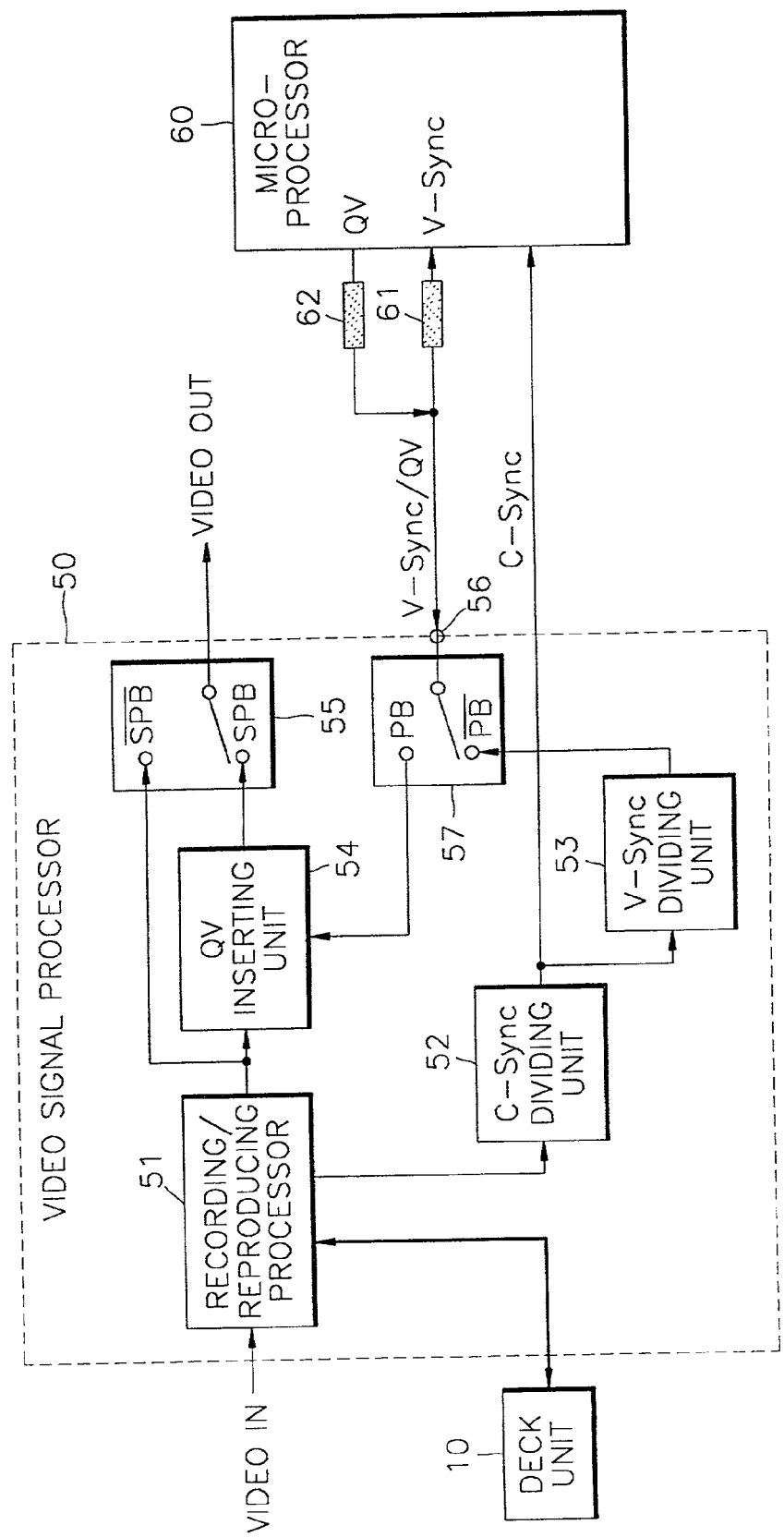
FIG. 2 illustrates a video signal processing system according to the present invention.

As shown in FIG. 2, a signal processing system to which the present invention is applied has a deck unit 10, a video signal processor 50, and a microprocessor 60.

Here, the video signal processor 50 IC is formed of a recording/reproducing processor 51, a composite synchronization signal dividing unit 53, a vertical synchronization signal dividing unit 53, a quasi vertical synchronization inserting unit 54, a switching unit 57, a switching unit 55, and a single pin port 56 for outputting a vertical synchronization signal and inputting a quasi vertical synchronization signal.

For impedance matching, resistors 61 and 62 are connected to a port for inputting a vertical synchronization signal and a port for outputting a quasi vertical synchronization signal, respectively, of the microprocessor 60, and the microprocessor 60 is connected to the pin port 56 of the video signal processor 50 through the resistors 61 and 62.

The recording/reproducing processor 51, in a recording mode, modulates an input video signal (Video In), and transmits the modulated signal to the deck unit 10 so that the signal can be recorded in a recording medium, and, in a reproducing mode, demodulates a signal read by the video head of the deck unit 10, and outputs the signal in the form of a video signal before recording.

The composite synchronization signal dividing unit 53 receives a video signal output from the recording/reproducing processor 51, and separates a composite synchronization signal (C-Sync), containing a vertical synchronization signal and a horizontal synchronization signal, from the video signal. Then, the composite synchronization signal (C-Sync) is input to the microprocessor 60.

The vertical synchronization dividing unit 53 of the video signal processor 50 separates a vertical synchronization signal (V-Sync) from the composite synchronization signal (C-Sync) output from the composite synchronization signal dividing unit 52.

In a recording mode, the microprocessor 60 controls the drum motor and capstan motor contained in the deck 10 using the composite synchronization signal and vertical synchronization signal as servo control signals.

Microprocessor 60 generates a quasi vertical synchronization signal (QV, Quasi V-Sync) in special reproducing modes such as a still mode or a slow mode. Here, the quasi vertical synchronization signal is a vertical synchronization signal which is arbitrarily generated using a head switching pulse (not shown) for switching a video head contained in the deck 10.

The quasi vertical synchronization inserting unit 54 receives the quasi vertical synchronization signal (QV) output from the microprocessor 60, and inserts the quasi vertical synchronization signal (QV) into the video signal output from the recording/reproducing processor 51 during a special reproducing mode.

The switching unit 55 controls connections so that a video output port is connected to an output terminal of the quasi vertical synchronization inserting unit 54 in a special reproducing mode (SPB), and is connected to an output terminal of the recording/reproducing processor 51 in the remaining modes (SPB). Though the quasi vertical synchronization inserting unit 54 and the switching unit 55 are separately formed in the embodiment of FIG. 2, a circuit for the switching unit 55 can be designed to be included in the quasi vertical synchronization inserting unit 54 so that a quasi vertical synchronization signal can be inserted into an output video signal only in a special reproducing mode.

The switching unit 57 is connected to an output terminal of the vertical synchronization dividing unit 53 and an input terminal of the quasi vertical synchronization inserting unit 54, and also connected to the pin port 56 operating as an input/output port. Here, the switching unit 57 controls connections so that the pin port 56 is connected to the quasi vertical synchronization inserting unit 54 in a special reproducing mode (PB), and connected to the vertical synchronization dividing unit 53 in the remaining modes ($\overline{PB}$).

Accordingly, since the pin port 56 of the video signal processor 50 is used as an output port for a vertical synchronization signal in a mode other than a special reproducing mode, and is used as an input port for a quasi vertical synchronization signal in a special reproducing mode, the pin port 56 is connected to the microprocessor 60 through resistors 61 and 62 for impedance matching. Also, for safer impedance matching, the input port for a vertical synchronization (V-Sync) signal of the microprocessor 60 is designed to have a high impedance state during a special reproducing mode, and the output port of a quasi synchronization (QV) signal is designed to operate as an output port in the special reproducing mode, and to have a high impedance state in a recording mode.

According to this method for designing a video IC and a video signal processing apparatus, the vertical synchronization signal output port and the quasi vertical synchronization input port can be formed in a signal pin port 56 of an IC, and therefore a vertical synchronization dividing circuit can be designed inside a video signal processing IC without increasing the number of IC pin ports.

By designing a vertical synchronization dividing circuit inside an IC without increasing the number of pins in a video signal processing IC, the present invention can reduce the number of components, material costs, and save the PCB space. In addition, by integrating the vertical synchronization dividing circuit inside an IC, the component difference of a discrete device can be reduced, which enhances IC performance.

What is claimed is:

1. A video signal processing integrated circuit for use in a video recording/reproducing apparatus, the video signal processing integrated circuit comprising, as a single chip:
    a video recording/reproducing processor for providing a video signal to be recorded on a storage medium and for reproducing a video signal recorded on said storage medium;
    a composite synchronization dividing unit for separating a composite synchronization signal from a video signal output by said video recording/reproducing processor;
    a vertical synchronization dividing unit for separating a vertical synchronization signal from the composite synchronization signal;
    a quasi vertical synchronization inserting unit for inserting a quasi vertical synchronization signal in the video signal output from said video recording/reproducing processor;
    a single pin port for outputting the vertical synchronization signal from said video signal processing integrated circuit and inputting a quasi vertical synchronization signal to said video signal processing integrated circuit, said single pin port to operate as an input port for inputting said quasi vertical synchronization signal in a special reproducing mode, and to operate as an output port for outputting the vertical synchronization signal in all other modes of said video signal processing integrated circuit; and
    a switching unit for providing the vertical synchronization signal, which is input from the vertical synchronization dividing unit, to the pin port, or providing the quasi vertical synchronization signal, which is input from the pin port, to the quasi vertical synchronization inserting unit.

2. The video signal processing integrated circuit of claim 1, wherein the switching unit controls connections so that in a special reproducing mode, a quasi vertical synchronization signal, which is input to the pin port, is output to the quasi vertical synchronization inserting unit, and all other modes, a vertical synchronization signal output from the vertical synchronization dividing unit is output to the pin port.

3. The video signal processing integrated circuit of claim 1, further comprising another switching unit for selectively outputting from said video signal processing integrated circuit, the video signal output from said video recording/reproducing processor or the video signal output from said quasi vertical synchronization inserting unit.

4. The video signal processing integrated circuit of claim 3, wherein said another switching unit outputs the video signal output from said quasi vertical synchronization inserting unit in a special reproducing mode, and in all other modes, outputs the video signal output from said video recording/reproducing processor.

5. A video signal processing apparatus integrated on a single chip, comprising:
    a recording and reproducing processor for modulating an input video signal to be recorded on a recording medium and for demodulating a video signal reproduced from said recording medium;
    a composite synchronization dividing unit for separating a composite synchronization signal from video signals output from the recording and reproducing processor;
    a vertical synchronization dividing unit for separating a vertical synchronization signal from the composite synchronization signal;
    a single pin port for outputting the vertical synchronization signal and inputting a quasi vertical synchronization signal;
    a quasi vertical synchronization inserting unit for inserting a quasi vertical synchronization signal into a reproduced video signal output from said recording and reproducing processor;
    a first switching unit for selectively providing the vertical synchronization signal from the vertical synchronization dividing unit to the pin port, or for providing the quasi vertical synchronization signal to said quasi vertical synchronization inserting unit; and
    a second switching unit for selectively connecting the reproduced video signal having the inserted quasi vertical synchronization signal, output from an output terminal of the quasi vertical synchronization inserting unit, to a video output port in a special reproducing mode, and connecting the reproduced video signal, output from the recording and reproducing processor, to the video output port in all other modes of said video signal processing apparatus.

6. The video signal processing apparatus of claim 5, wherein the pin port is designed to operate as an input port in said special reproducing mode, and to operate as an output port in a recording mode.

7. The video signal processing apparatus of claim 5, wherein the first switching unit controls connections so that the quasi vertical synchronization signal, which is input to the pin port, is output to the quasi vertical synchronization inserting unit in the special reproducing mode, and in all the other modes, the vertical synchronization signal, which is output from the vertical synchronization dividing unit, is output to the pin port.

8. The video signal processing apparatus of claim 5, having a structure wherein the pin port is connected to both a vertical synchronization signal input port and a quasi synchronization signal output port of a microprocessor.

9. The video signal processing apparatus of claim 8, wherein the vertical synchronization signal input port is in a high impedance state in a special reproducing mode, and the quasi vertical synchronization signal output port operates as an output port in said special reproducing mode and is in a high impedance state in a recording mode.

10. The video signal processing apparatus of claim 5, having a structure wherein the pin port is connected to both a vertical synchronization signal input port of a microprocessor via a first resistor and a quasi synchronization signal output port of said microprocessor via a second resistor.

11. The video signal processing apparatus of claim 10, wherein said first and second resistors are impedance matching resistors.

12. The video signal processing apparatus of claim 11, wherein the vertical synchronization signal input port is in a high impedance state in a special reproducing mode, and the quasi vertical synchronization signal output port operates as an output port in said special reproducing mode and is in a high impedance state in a recording mode.

13. A method for designing a video signal processing integrated circuit having a recording and reproducing processor for modulating/demodulating a video signal, a vertical synchronization dividing unit, and a quasi vertical synchronization inserting unit, the method comprising the steps of:

forming a single pin port for outputting a vertical synchronization signal separated from a composite synchronous signal by said a vertical synchronization dividing unit and for inputting to said video signal processing integrated circuit a quasi vertical synchronization signal produced by a microprocessor; and designing the pin port to operate as an input port for inputting said quasi vertical synchronization signal in a special reproducing mode, and to operate as an output port for outputting the vertical synchronization signal to the microprocessor in all other modes of said video signal processing integrated circuit.

14. The method of claim 13, further comprising the step of:

selectively connecting, via a switching circuit, the single pin port and said quasi vertical synchronization inserting unit to provide said quasi vertical synchronization signal to said quasi vertical synchronization inserting unit in said special reproducing mode or connecting the single pin port to said vertical synchronization dividing unit to provide the vertical synchronization signal output from the vertical synchronization dividing unit to said single pin port in all the other modes.

* * * * *